(12) United States Patent
Zhang et al.

(10) Patent No.: US 6,240,123 B1
(45) Date of Patent: May 29, 2001

(54) ASYNCHRONOUS SPREAD SPECTRUM CLOCKING

(75) Inventors: Michael T. Zhang, Portland; Songmin Kim, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/153,658

(22) Filed: Sep. 15, 1998

Related U.S. Application Data

(63) Continuation-in-part of application No. 09/119,111, filed on Jul. 20, 1998.

(51) Int. Cl.$^7$ .............................. A61F 2/06; H04L 27/30
(52) U.S. Cl. ..................... 375/130; 713/500; 375/131; 375/376
(58) Field of Search ..................... 375/354, 370, 375/130, 140, 131, 141, 346, 376; 713/500, 501, 600

(56) References Cited

U.S. PATENT DOCUMENTS

| 5,488,627 | | 1/1996 | Hardin et al. | 375/204 |
| 5,812,590 | * | 9/1998 | Black et al. | 375/200 |
| 5,872,807 | * | 2/1999 | Booth et al. | 375/200 |
| 5,943,382 | * | 8/1999 | Li et al. | 375/376 |

* cited by examiner

*Primary Examiner*—Chi Pham
*Assistant Examiner*—Mohammed Lachhab
(74) *Attorney, Agent, or Firm*—Trop, Pruner & Hu

(57) ABSTRACT

A method for use with a computer system includes modulating a first clock signal according to a first frequency-time profile to generate a second spread spectrum clock signal. The first clock signal is modulated according to a second frequency-time profile that is asynchronous to the first frequency-time profile to generate a third spread spectrum clock signal.

19 Claims, 7 Drawing Sheets

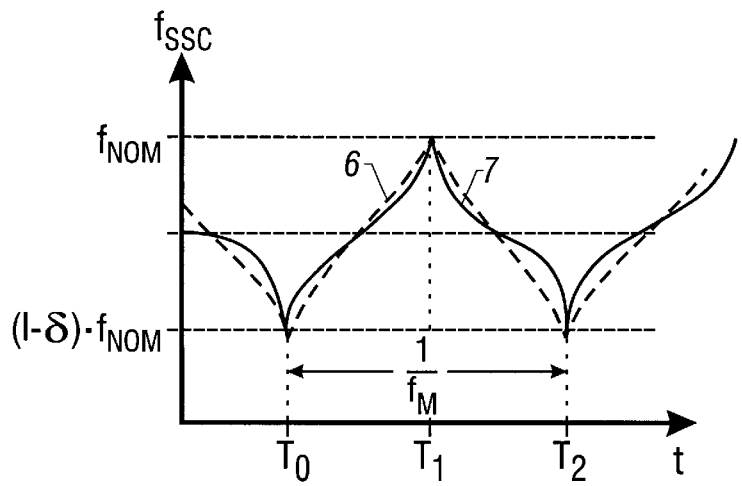
FIG. 3
*(PRIOR ART)*
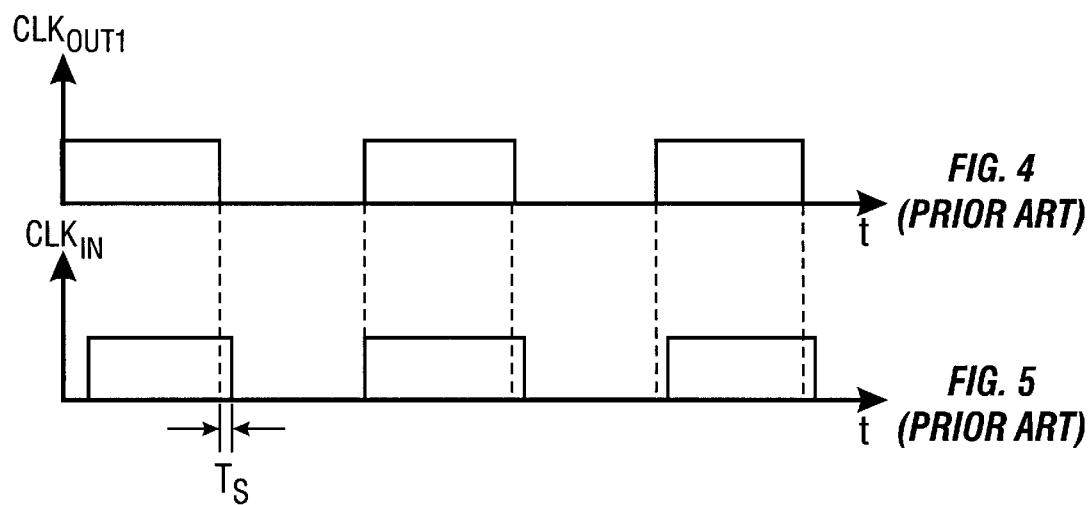
FIG. 4
*(PRIOR ART)*
FIG. 5
*(PRIOR ART)*

ASYNCHRONOUS SPREAD SPECTRUM CLOCKING

CROSS-REFERENCE TO RELATED APPLICATIONS

This is a continuation-in-part of U.S. patent application Ser. No. 09/119,111 that was filed on Jul. 20, 1998.

BACKGROUND

The invention relates to asynchronous spread spectrum clocking.

A typical computer system uses clock signals to synchronize operations of digital circuitry of the system. Unfortunately, spectral components of these clock signals may contribute to the radiation of electromagnetic interference (EMI) emissions from the system. For example, referring to FIG. 1, the spectral components of a clock signal may include a spectral component 10 that is located at a main, or fundamental, frequency (called $f_0$ and may be, for example, 100 MHz) as well as spectral components 12 that are located at harmonic frequencies (i.e., frequencies located at multiples of the $f_0$ frequency).

The EMI emissions may cause undesirable interference with the circuitry of the computer system and other electronic equipment near the computer system. To reduce the EMI emissions outside of the computer system, the circuitry of the computer system may be housed inside a metal casing that prevents the EMI emissions from propagating outside of the casing. However, the casing often adds to the weight and cost of the computer system, and the casing may have a limited EMI shielding capability.

In addition to the casing, the EMI emissions may be further reduced by spread spectrum clocking (SSC), a technique that reduces the energy peaks present in the spectral components of the clock signal. In SSC, a spread spectrum clock signal (called $CLK_{IN}$ (see FIG. 2)) may be generated by an SSC generator 14. The SSC generator 14 typically receives a reference clock signal (from a reference clock generator 13) that has a nominal fundamental frequency (called $f_{NOM}$). The SSC generator 14 modulates the reference clock signal according to a frequency-time profile 6 or 7 (see FIG. 3) to generate the $CLK_{IN}$ signal. Referring to FIG. 3, the $CLK_{IN}$ clock signal has, in place of a constant fundamental frequency, a time-varying main frequency (called $f_{SSC}$) that varies slightly (varies by 1 MHz, for example) near the $f_{NOM}$ frequency, in a manner described below. As a result of the modulation, spectral components 18 (see FIG. 1) of the $CLK_{IN}$ clock signal have typically smaller magnitudes than the corresponding spectral components 10 and 12 of traditional non-SSC modulated clock signals, and as a result, the $CLK_{IN}$ signal typically causes fewer EMI emissions.

The frequency-time profile 6, 7 may cause the $f_{SSC}$ frequency to periodically vary from the $f_{NOM}$ frequency that is the maximum frequency to a minimum frequency that is approximately equal to $(1\delta) f_{NOM}$, where "$\delta$" represents an SSC modulation index. The frequency-time profile 6 may, for example, resemble a sawtooth waveform, and the frequency-time profile 7 may, for example, resemble a linear and cubic combination of the sawtooth waveform. The frequency at which the $f_{SSC}$ frequency cycles is often referred to as the SSC modulation frequency (called $f_M$), and the $f_M$ frequency may be higher than audio frequencies (20 Hz to 20 kHz frequencies) but significantly lower than the $f_{NOM}$ frequency. As examples, the $f_M$ frequency may be near 33 kHz, and the $f_{NOM}$ frequency may be near 100 MHz.

Referring back to FIG. 2, the computer system may have several devices (bus devices, bridge circuits and one or more microprocessors, as examples) that synchronize operations to the $CLK_{IN}$ signal. To route the $CLK_{IN}$ signal to these devices, the computer system may include clock drivers 11 (drivers $11_1$, $11_2$ ... $11_N$, as examples) that are used to fan out the $CLK_{IN}$ signal onto associated clock transmission lines 12 (lines $12_1$, $12_2$ ... $12_N$, as examples). In this manner, a phase locked loop (PLL) 15 (PLLs $15_1$, $15_2$ ... $15_N$, as examples) may be located near each device to regenerate the $CLK_{IN}$ clock signal from the associated clock transmission line 12. As an example, the PLL $15_1$ may receive and lock onto the clock signal that is finished by the transmission line $12_1$ to generate a clock signal (called $CLK_{OUT1}$) for use by a device near the PLL $15_1$. The PLL 15 may be part of the device.

As an example, the $CLK_{OUT1}$ clock signal ideally is a duplicate of the $CLK_{IN}$ signal. However, referring to FIGS. 4 and 5, the $CLK_{OUT1}$ clock signal typically leads or lags the $CLK_{IN}$ signal by a phase error, or skew (called $T_S$). The computer system typically is capable of tolerating some level of skew.

The clock transmission lines 12 and possibly other circuitry of the computer system that carry the clock signals may serve as antennas for EMI emissions. Unfortunately, although SSC as described above may reduce the magnitudes of the spectral components of each clock signal (and thus, reduce the amount of EMI emissions that may be attributed to that signal), by the principle of superposition, the respective spectral components of the clock signals directly sum with each other to collectively contribute to the EMI emissions. Thus, although SSC may be used, the EMI emissions may still reach unacceptable levels.

Thus, there is a continuing need for an arrangement to reduce the EMI emissions of such a system.

SUMMARY

In one embodiment, a method for use with a computer system includes modulating a first clock signal according to a first frequency-time profile to generate a second spread spectrum clock signal. The first clock signal is modulated according to a second frequency-time profile that is asynchronous to the first frequency-time profile to generate a third spread spectrum clock signal.

In another embodiment, a clock generator includes first and second modulation circuits. The first modulation circuit modulates a first clock signal according to a first frequency-time profile to generate a second spread spectrum clock signal. The second modulation circuit modulates the first clock signal according to a second frequency-time profile asynchronous to the first frequency-time profile to generate a third spread spectrum clock signal.

BRIEF DESCRIPTION OF THE DRAWING

FIG. 3 is a graph illustrating a spread spectrum frequency-time profile.

FIGS. 4 and 5 are waveforms of clock signals of the system of FIG. 2.

DETAILED DESCRIPTION

Figure 1:
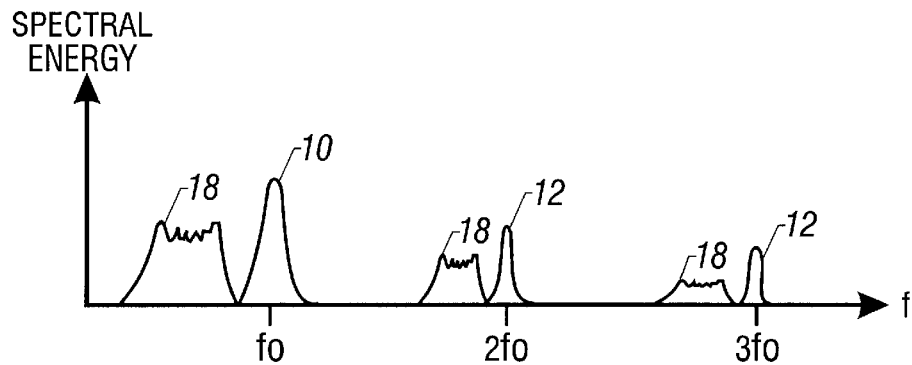
FIG. 1 is a graph of spectral energies of different clock signals.
Figure 2:
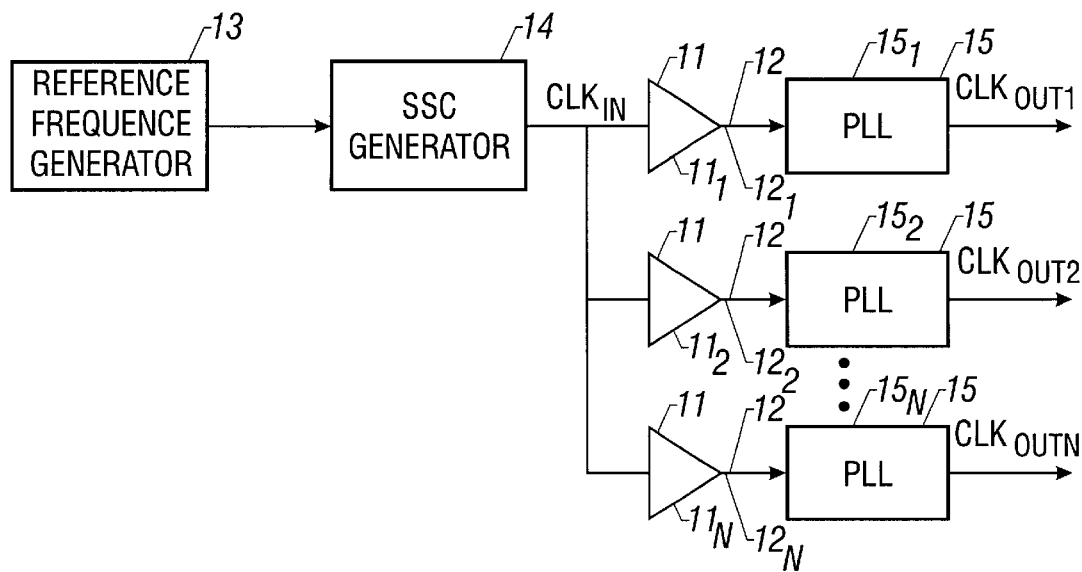
FIG. 2 is a block diagram of a spread spectrum clocking system of the prior art.
Figure 6:
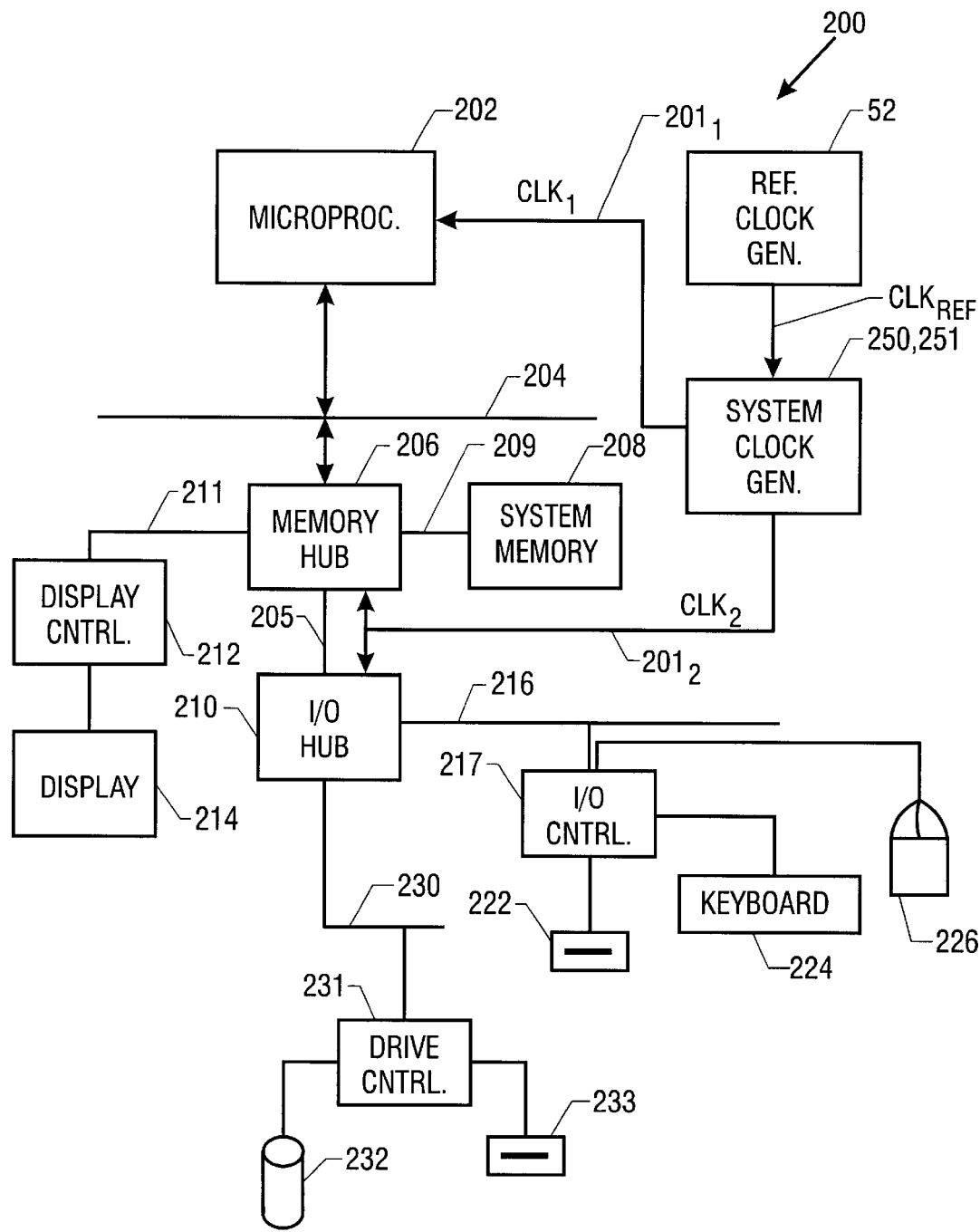
FIG. 6 is a block diagram of a computer system according to an embodiment of the invention.

Referring to FIG. 6, an embodiment 200 of a computer system in accordance with the invention includes a system clock generator 250 that uses an asynchronous spread spectrum modulation technique (described below) to generate spread spectrum clock signals. As described below, for purposes of reducing EMI emissions, the asynchronous modulation technique keeps the respective spectral components of the clock signals from directly surnming with each other and thus, reduces the total spectral energy that otherwise contributes to EMI emissions.

As an example of the asynchronous modulation technique, the system clock generator 250 may generate two exemplary spread spectrum clock signals called $CLK_1$ and $CLK_2$ and may generate one or more additional spread spectrum clock signals that are not shown. Instead of generating the $CLK_1$ and $CLK_2$ clock signals by modulating a reference clock signal (called $CLK_{REF}$) pursuant to a single SSC frequency-time profile, the system generator 250 generates the $CLK_1$ and $CLK_2$ clock signals by modulating the $CLK_{REF}$ clock signal according to at least two periodic SSC frequency-time profiles that are asynchronous with respect to each other. In this manner, referring to FIG. 7, the clock generator 250 modulates the $CLK_{REF}$ signal according to a frequency-time profile 36 to produce the $CLK_1$ clock signal and modulates the $CLK_{REF}$ clock according to a frequency-time profile 38 to produce the $CLK_2$ clock signal.

In some embodiments, the frequency-time profiles 3 and 38 are substantially identical except that the frequency-time profile 36 lags the frequency-time profile 38 by a time interval (called $\Delta T$) that is not a multiple of a SSC modulation period ($1/f_M$, where $f_M$ is the SSC modulation frequency) of the frequency-time profile 38. As a result, the profiles 36 and 38 are not synchronized to each other, but rather, are asynchronous with respect to each other. The $\Delta T$ time interval establishes a skew (called $T_S$) between the $CLK_1$ and $CLK_2$ clock signals.

Figure 11:
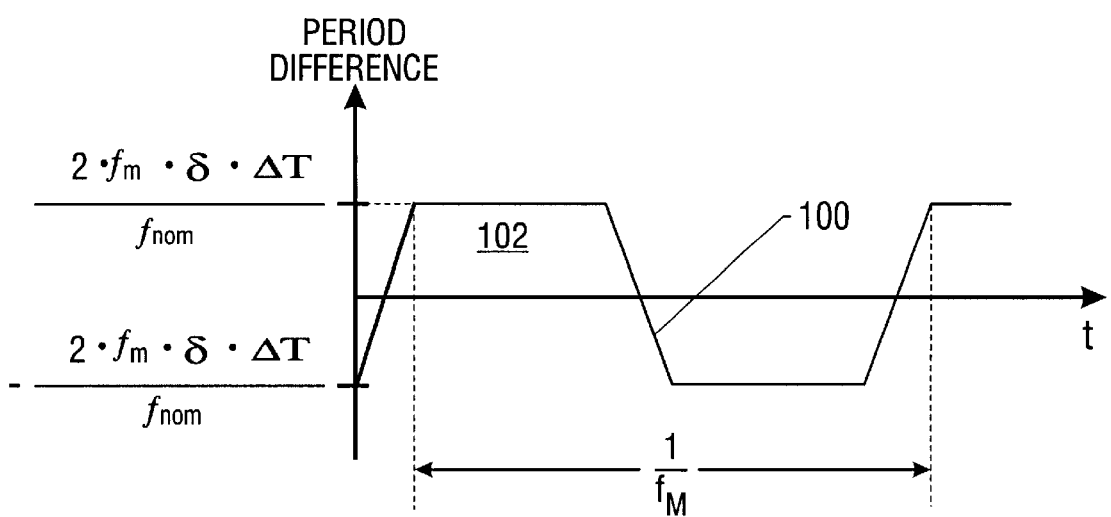
FIG. 11 is a graph illustrating a phase difference between the clock signals of the computer system of FIG. 6.

FIG. 11 shows a plot 100 of a difference between the periods of the $CLK_1$ and $CLK_2$ clock signals. As can be seen, the difference may vary by $$\pm \frac{2 \cdot f_M \cdot \delta \cdot \Delta T}{f_{NOM}},$$

where $f_{NOM}$ is the nominal fundamental clock frequency and "$\delta$" is the SSC modulation index. The $T_S$ skew may be described by the following:

$$T_s = \text{area } 102$$
$$= \frac{2 \cdot f_M \cdot \delta \cdot \Delta T}{f_{NOM}} \cdot \left(\frac{1}{2 \cdot f_M} - \Delta T\right) \cdot f_{NOM} + \frac{1}{2} \cdot \frac{2 \cdot f_M \cdot \delta \cdot \Delta T}{f_{NOM}} \cdot \Delta T \cdot f_{NOM}$$
$$= f_M \cdot \delta \cdot \Delta T \cdot \left(\frac{1}{f_M} - \Delta T\right) \approx \delta \cdot \Delta T,$$

where the area 102 is the area under the difference plot 100 for one half cycle (i.e., $\frac{1}{2} \cdot f_M$).

In some embodiments, for a synchronous clock system (i.e., for a system where the $CLK_1$ and $CLK_2$ clock signals are ideally synchronized to each other), the $\Delta T$ time interval may establish a $T_S$ skew that is near the maximum skew that the computer system 200 is capable of tolerating. In other embodiments, the above-described arrangement may be used in a source synchronous clock system, a system where the $T_S$ skew is irrelevant.

Figure 7:
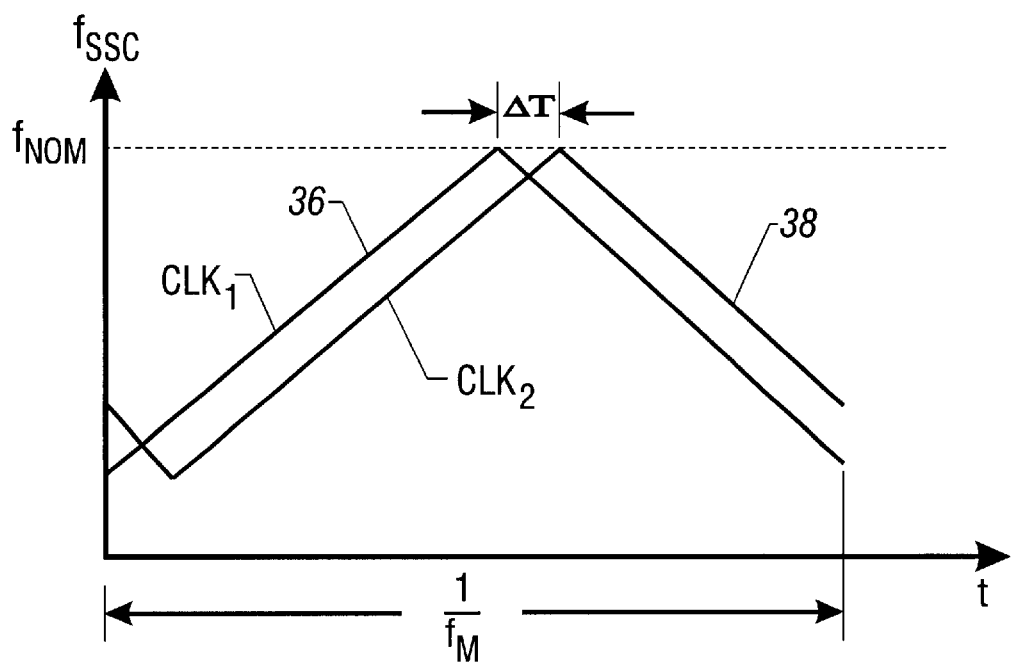
FIG. 7 is a graph illustrating two spread spectrum frequency-time profiles used by a system clock generator of FIG. 6.

In some embodiments, the frequency-time profiles 36 and 38 may be sawtooth, or triangular, SSC modulation profiles, as shown in FIG. 7. Other types of frequency-time profiles may be used. Furthermore, the $CLK_1$ and $CLK_2$ clock signals, as examples, may each be modulated to a different type of SSC frequency-time profile.

Referring back to FIG. 6, in some embodiments, the system clock generator 250 may furnish the $CLK_1$ and $CLK_2$ clock signals, as examples, to clock lines $201_1$ and $201_2$, respectively, that route the $CLK_1$ and $CLK_2$ clock signals to devices of the computer system 200. The devices, in turn, may use the $CLK_1$ and $CLK_2$ clock signals to synchronize operations. As an example, the $CLK_1$ clock signal may be received by a microprocessor 202 and used to generate the core clock signal of the microprocessor 202. As another example, the $CLK_2$ signal may be received by a bridge circuit, or input output (I/O) hub 210, and used to clock circuitry of the I/O hub 210 and bus cycles on buses 216 and 230 that are coupled to the I/O hub 210. The microprocessor 202 and the I/O hub 210 may include internal phase locked loops (PLLs) (not shown) to lock onto the received spread spectrum clock signals.

Figure 8:
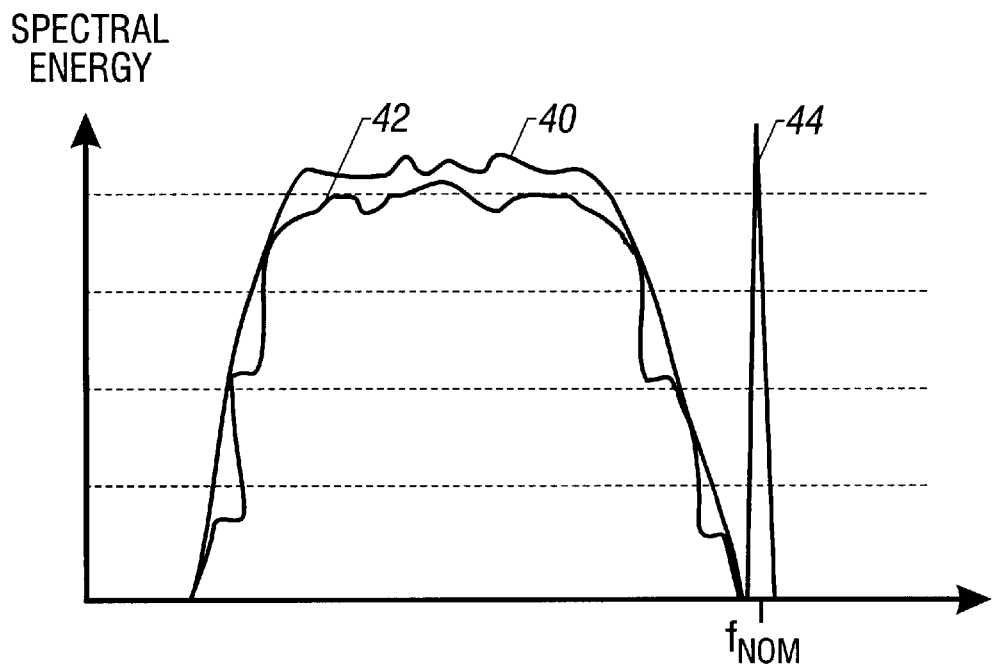
FIG. 8 shows graphs of combined spectral energies for different clock systems.

As a result of the asynchronous modulation technique, the respective spectral components of the clock signals do not directly sum with each for purposes of EMI emissions. Instead, due to the asynchronous modulation, the respective spectral components are slightly shifted in frequency with respect to each other, and thus, the spectral components do not directly add together. As an example, a combined magnitude 42 (See FIG. 8) of energy for the fundamental spectral components (i.e., the spectral components near the main clock frequency) is less than a combined magnitude of energy 40 for fundamental spectral components when conventional SSC modulation techniques are used. As can be seen from FIG. 8, a combined magnitude 44 of spectral energies for the fundamental spectral components when SSC is not used is greater than the other magnitudes 40 and 42.

Thus, the advantages of using the above-identified asynchronous modulation technique may include one or more of the following: EMI emissions may be reduced while computer system timing requirements are met; the operating frequency of the microprocessor may be increased; existing systems may be easily upgraded; and minimal costs may be required.

Figure 9:
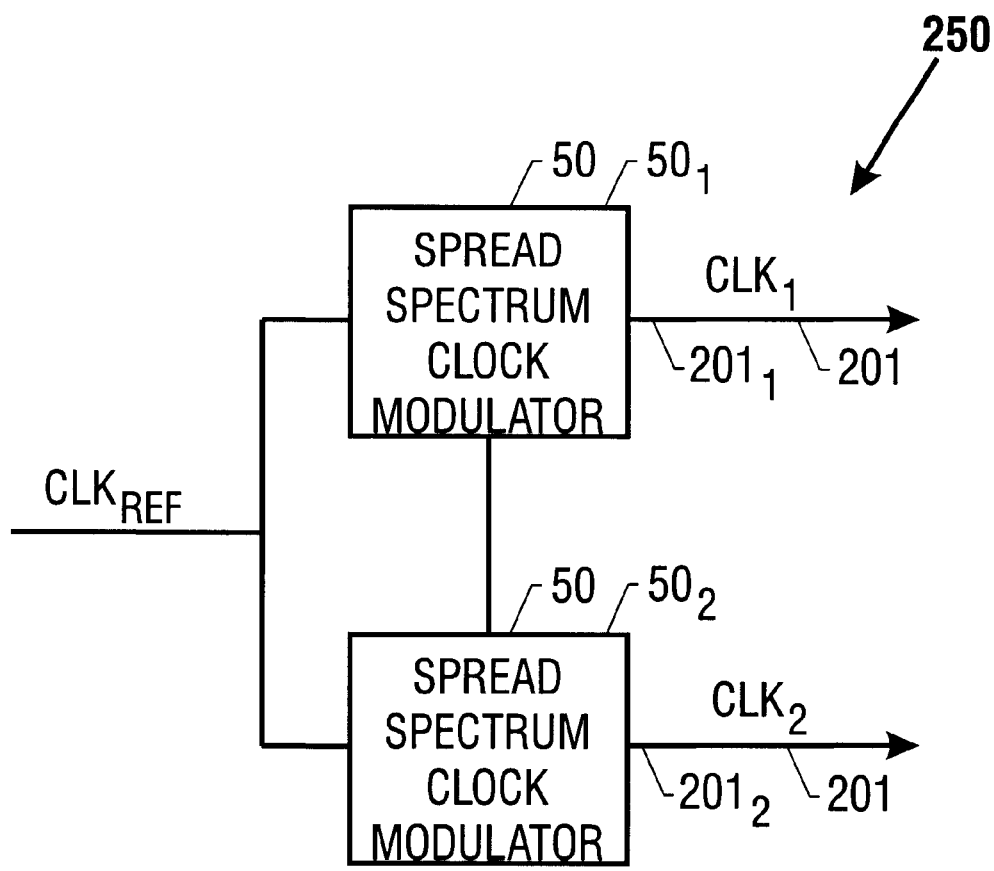
FIG. 9 is a schematic diagram of the system clock generator of FIG. 6.

Referring to FIG. 9, in some embodiments, the system clock generator 250 may include multiple spread spectrum clock modulators 50 (modulators $50_1$ and $50_2$, as examples), each of which furnishes a different spread spectrum clock signal, such as the $CLK_1$ and $CLK_2$ clock signals. In other embodiments, the system clock generator 250 may include a single spread spectrum clock modulator that furnishes multiple asynchronously modulated clock signals.

For embodiments including multiple spread spectrum modulators, each spread spectrum clock modulator 50 may receive the $CLK_{REF}$ clock signal and modulate the $CLK_{REF}$ clock signal according to a frequency-time profile that is asynchronous to the frequency-time profile used by the other modulators 50. As examples, the spread spectrum clock modulator $50_1$ may use the frequency-time profile 36 to generate the $CLK_1$ signal, and the spread spectrum clock modulator $50_2$ may use the frequency-time profile 38 to generate the $CLK_2$ signal.

Figure 10:
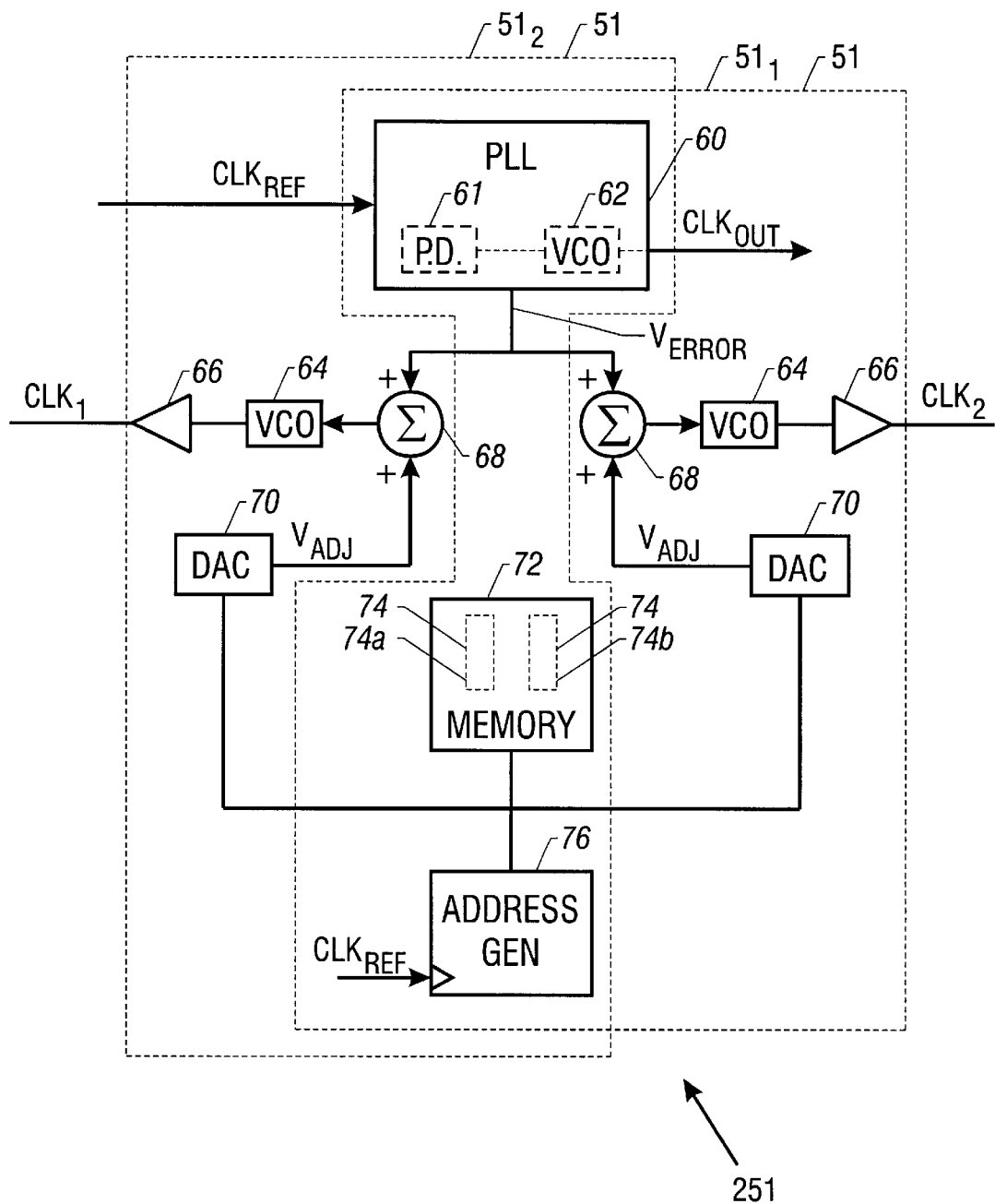
FIG. 10 is a more detailed schematic diagram of the system clock generator of FIG. 9.

Referring to FIG. 10, in some embodiments, the system clock generator 250 may be replaced by a system clock generator 251 that includes modulation circuits 51 (modulation circuits $51_1$ and $51_2$, as examples) that may or may not be separate modulators, as described below. As an example, in some embodiments, each modulation circuit 51 may include a phase locked loop (PLL) 60 which receives the $CLK_{REF}$ clock signal at its input terminal, and the PLL 60 may include a voltage controlled oscillator (VCO) 62 that furnishes an output signal (called $CLK_{OUT}$) at its output terminal. As is typical, the VCO 62 may receive an error voltage (called $V_{ERROR}$) that is generated inside the PLL 60 by a phase detector 61 and indicates the frequency of the $CLK_{OUT}$ signal.

The modulation circuit 51 may adjust the $V_{ERROR}$ signal and furnish the adjusted error signal to a VCO 64 (of similar design to the VCO 62) to produce the modulated clock signal, such as the $CLK_1$ or $CLK_2$ clock signal, which appears at the output terminal of a buffer. An input terminal of the buffer 66 may be coupled to the output terminal of the VCO 64.

To perform the modulation, the modulation circuit 51 may include an adder circuit 68 that receives the $V_{ERROR}$ signal and a frequency adjustment signal called $V_{ADJ}$. The adder circuit 68 combines the $V_{ERROR}$ and $V_{ADJ}$ signals and furnishes the resultant adjusted error signal to the VCO 64. Due to the combination of the $V_{ADJ}$ and $V_{ERROR}$ signals by the adder circuit 68, the $V_{ADJ}$ signal upwardly or downwardly adjusts (depending on its sign) the $V_{ERROR}$ signal to adjust the frequencies of the $CLK_1$ or $CLK_2$ signal, as examples. The $V_{ADJ}$ signal may be furnished by a digital-to-analog circuit (DAC) 70 that generates the $V_{ADJ}$ signal based on values of a look-up table 74 (look-up tables 74a and 74b, as examples) that is stored in a memory 72.

As an example, the modulation circuit $51_1$ may include a look-up table 74a that stores a sequence of values that indicate voltages to add to the $V_{ERROR}$ voltage to perform modulation pursuant to the frequency-time profile 36. Similarly, the modulation circuit $51_2$ may include a look-up table 74b that stores a sequence of values that indicate voltage to add to the $V_{ERROR}$ signal to perform modulation pursuant to the frequency-time profile 38. The modulation circuit 51 may include an address generator 76 that receives the $CLK_{REF}$ clock signal and generates the appropriate addresses to traverse the sequences stored in the look-up table(s) 74.

In some embodiments, the modulation circuits $51_1$ and $51_2$ may each include all of the components described above and thus, may each be separate modulators. However, in other embodiments, the modulation circuits $51_1$ and $51_2$ may share common components and thus, may form a single modulator. For the exemplary circuitry shown in FIG. 10, the PLL 60, the memory 72 and the address generator 67 may be shared by the modulation circuits $51_1$ and $51_2$.

Referring back to FIG. 6, in some embodiments, the computer system 200 may include a local bus, or front side bus 204, that is coupled to a bridge circuit, or memory hub 206, and the microprocessor 202. The memory hub 206 may interface the front side bus 204, a memory bus 209 and an Advanced Graphics Port (AGP) bus 211 together, as an example. A system memory 208 may be coupled to the memory bus 209, and a display controller 212 (that controls a display 214) may be coupled to the AGP bus 211. A hub communication link 205 may couple the memory hub 206 to the I/O hub 210.

The I/O hub 210 may include interfaces to the buses 216 and 230 which may be, as examples, an Industry Standard Architecture (ISA) bus and a Peripheral Component Interconnect (PCI) bus, respectively. An I/O controller 217 may be coupled to the bus 216 and receive input data from a keyboard 224 and a mouse 226, as examples. The I/O controller 217 may also control operations of a floppy disk drive 222. A drive controller 231 may be coupled to the bus 230 and may control operations of a hard disk drive 232 and a CD-ROM drive 233, as examples. The computer system 200 may also include a reference clock generator 52 that furnishes the $CLK_{REF}$ clock signal.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use with a computer system, comprising:
   modulating a first clock signal according to a first frequency-time profile to generate a second spread spectrum clock signal; and
   modulating the first clock signal according a second frequency-time profile asynchronous to the first frequency-time profile to generate a third spread spectrum clock signal.

2. The method of claim 1, further comprising:
   demodulating the second and third spread spectrum clock signals to generate fourth clock signals that are substantially synchronized to the first clock signal.

3. The method of claim 2, further comprising:
   using the fourth clock signals to substantially synchronize operations of circuitry of the computer system to the first clock signal.

4. The method of claim 1, wherein the first frequency-time profile comprises a periodic profile.

5. The method of claim 1, wherein the second frequency-time profile comprises a phase shifted version of the first frequency-time profile.

6. The method of claim 1, wherein the first frequency-time profile comprises a triangular frequency-time profile.

7. The method of claim 1, wherein the first and second frequency-time profiles comprise triangular frequency-time profiles.

8. A clock generator comprising:
   a first modulation circuit to modulate a first clock signal according to a first frequency-time profile to generate a second spread spectrum clock signal; and
   a second modulation circuit to modulate the first clock signal according to a second frequency-time profile asynchronous to the first frequency-time profile to generate a third spread spectrum clock signal.

9. The clock generator of claim 8, wherein the first and second modulation circuits each comprise a spread spectrum clock modulator.

10. The clock generator of claim 8, wherein the first and second modulation circuits collectively comprise a spread spectrum modulator.

11. The clock generator of claim 8, wherein at least one of the first and second modulation circuits comprises a memory to store values indicative of at least one of the first and second frequency-time profiles.

12. The clock generator of claim 8, further comprising:
   a phase locked loop to generate a first frequency signal indicative of a frequency of the first clock signal;
   another circuit to provide a second frequency signal to indicate a modulation adjustment to the first clock signal;

an adder circuit to combine the first and second frequency signals to produce a third frequency signal; and a voltage controlled oscillator to receive the third frequency signal and provide at least one of the second and third spread spectrum clock signals.

13. A computer system comprising:

a reference clock generation circuit to generate a first clock signal;

a first modulation circuit to modulate the first clock signal according to a first frequency-time profile to generate a second spread spectrum clock signal;

a second clock modulation circuit to modulate the first clock signal according to a second frequency-time profile asynchronous to the first frequency-time profile to generate a third spread spectrum clock signal; and a device to receive at least one of the second and third spread spectrum clock signals.

14. The computer system of claim 13, wherein the first and second modulation circuits each comprise a spread spectrum clock modulator.

15. The computer system of claim 13, wherein the first and second modulation circuits collectively comprise a spread spectrum modulator.

16. The computer system of claim 13, wherein at least one of the first and second modulation circuits comprises a memory to store values indicative of at least one of the first and second frequency-time profiles.

17. The computer system of claim 13, further comprising:

a phase locked loop to generate a first frequency signal indicative of a frequency of the first clock signal;

another circuit to provide a second frequency signal to indicate a modulation adjustment to the first clock signal;

an adder circuit to combine the first and second frequency signals to produce a third frequency signal; and a voltage controlled oscillator to receive the third frequency signal and provide at least one of the second and third spread spectrum clock signals.

18. The computer system of claim 13, wherein the device comprises a processor.

19. The computer system of claim 13, wherein the device comprises a bridge circuit.

* * * * *